US012651226B2

(12) United States Patent
Krivonosova et al.

(10) Patent No.: US 12,651,226 B2
(45) Date of Patent: Jun. 9, 2026

(54) SYSTEMS AND SERVERS FOR FIRST PRINCIPLES-BASED PROCESS SIMULATION DRIVEN SELECTION FOR APPROPRIATE RESOURCE/OPERATING MODE

(71) Applicant: AVEVA SOFTWARE, LLC, Lake Forest, CA (US)

(72) Inventors: Aleksandra Krivonosova, Fulshear, TX (US); Ales Soudek, Brookshire, TX (US); Arijeet Majumdar, Cypress, TX (US); Shawn Andrew Davison, Salem, OR (US); Sonia Mara Cristina Echeverria Ferreira Cardoso, otl a+ee o Paulo (BR); Gonzalo Rodrigo Merciel, Madrid (ES)

(73) Assignee: Aveva Software, LLC, Lake Forest, CA (US)

( * ) Notice: Subject to any disclaimer, the term of this patent is extended or adjusted under 35 U.S.C. 154(b) by 146 days.

(21) Appl. No.: 18/095,377

(22) Filed: Jan. 10, 2023

(65) Prior Publication Data
US 2024/0232769 A1     Jul. 11, 2024

(51) Int. Cl.
*G06Q 10/0637* (2023.01)
*G06Q 10/067* (2023.01)
*G06Q 50/06* (2024.01)

(52) U.S. Cl.
CPC ..... *G06Q 10/06375* (2013.01); *G06Q 10/067* (2013.01); *G06Q 50/06* (2013.01)

(58) Field of Classification Search
CPC . G06Q 10/06375; G06Q 10/067; G06Q 50/06
See application file for complete search history.

(56) References Cited

U.S. PATENT DOCUMENTS 5,873,251 A * 2/1999 Iino .......................... F01K 13/02
                                                              60/660
9,348,394 B2 * 5/2016 Harper, III ............ G06F 1/3206
                      (Continued)

FOREIGN PATENT DOCUMENTS

EP      3550480 A1   10/2019
EP      3611688 A1   2/2020
EP      3709250 A1   9/2020

OTHER PUBLICATIONS

S. S, J. S, M. Esakiraj and J. R. Kishore, "PLC based Efficient Energy Management System in the Smart Grid," 2022 3rd International Conference on Smart Electronics and Communication (ICOSEC), Trichy, India, 2022, pp. 133-141, doi: 10.1109/ICOSEC54921.2022. 9952126. (Year: 2022).*

(Continued)

*Primary Examiner* — George Chen
*Assistant Examiner* — Tayar M Kyu
(74) *Attorney, Agent, or Firm* — Dergosits & Noah LLP; Todd A. Noah

(57) ABSTRACT

Some embodiments described in this disclosure are directed to a system for determining a deficit or surplus in green energy for use in an industrial process. In some embodiments, the system is configured to predict future available green energy using weather forecasts. In some embodiments, the system is configured to model power demand for an industrial process and determine whether a green energy source such as solar and/or wind will be able to meet the power demand. In some embodiments, the system is configured to suggest alternate energy sources for purchase to make up for a green energy deficit. In some embodiments, the system is configured to suggest a best time to buy or sell energy to optimize a profit or loss.

20 Claims, 12 Drawing Sheets

(56)        References Cited

U.S. PATENT DOCUMENTS

| | | | |
|---|---|---|---|
| 2002/0194113 A1* | 12/2002 | Lof | G01W 1/10 |
| | | | 705/37 |
| 2004/0024483 A1* | 2/2004 | Holcombe | G06Q 30/02 |
| | | | 700/122 |
| 2017/0364043 A1* | 12/2017 | Ganti | G05B 17/02 |
| 2022/0179381 A1* | 6/2022 | Carrasco Schmidt | |
| | | | H02J 13/00002 |
| 2023/0129742 A1* | 4/2023 | Yamasaki | H02J 3/00 |
| | | | 705/37 |

OTHER PUBLICATIONS

International Preliminary Report on Patentability from corresponding International Patent Application No. PCT/US2024/010916 dated Jul. 3, 2025.

International Search Report and Written Opinion from corresponding International Patent Application No. PCT/US2024/010916 dated Apr. 29, 2024.

* cited by examiner

Parameter which Reflects the Actual System Condition Optimized by the Workflow
Target Based on Single or Multiple Conditions
Projected (Simulated) Parameter \\\PIIProcessAI - PI System Explorer File　Search　View　Go　Tools　Help Database　Query Date　Back　Check In　Refresh　New Element　New Attribute piserver.eastus.cloudapp.azure.com Elements
- Assets
  - Europe
    - Netherlands
      - Eemshaven
        - Green Hydrogen Plant
          - Control Valve 01
          - Control Valve 02
          - Control Valve 03
          - Control Valve 04
          - DC_AC Inverter
          - Deionized Water Tank
          - Electrolyzer
          - Grid Power Supply
          - Hydrogen Compressor01
          - Omosis
          - Oxygen Compressor02
          - Pipeline_Out01
          - Pipeline_Out02
          - Solar Farm
            - SolarPanel 1
            - SolarPanel 2
            - SolarPanel 3
          - Storage Tank H2
          - Storage Tank O2
          - Water Collection Tank
          - Wind Farm
- Element Searches Green Hydrogen Plant General | Child Elements | Attributes | Parts | Analyses | Notification Rules | Version Filter

| Name | Value | Time Stamp | | |
|---|---|---|---|---|
| Category: APS- Outputs | | | | |
| Electrolyzer Power Consumption Forecast - Hourly | Pt Created | 11/5/2021 1:40:29 PM | PI Point | \\PIIUFL.H25m Electrolyzer kWh - Projection_de |
| H2 Hourly Production Forecast | Pt Created | 11/5/2021 1:40:34 PM | PI Point | \\PIIUFL.H25m H2 Production - Projection_demo |
| Category: APS- Inputs | | | | |
| SF 1Power | 476.47 kW | 11/5/2021 1:15:00 PM | PI Point | \\PIIUFL.Raw Solar Power |
| SF 1Power - Forecast | 3.84 kW | 11/5/2021 12:00:00 AM | PI Point | \\PIIUFL.FF-Solar Power Forecast-h |
| WF1Power | 968.82 kW | 11/5/2021 1:00:00 PM | PI Point | \\PIIUFL.System power generated kW |
| WF1Power - Forecast | 777.32 kW | 11/5/2021 3:00:00 PM | PI Point | \\PIIUFL.FF-System power generated kW-W-Wind |
| Category: Demand | | | | |
| H2 Daily Demand | 301.67 kg | 11/5/2021 12:00:00 AM | PI Point | \\PIIUFL.F_Hydrogen demand kg_per_day |
| H2 Hourly Demand | 22.022 kg | 11/5/2021 3:00:00 PM | PI Point | \\PIIUFL.F_Hydrogen demand kg_per_h |
| Category: Energy Cost | | | | |
| Hour | 15 | 11/5/2021 3:00:00 PM | PI Point | \\PII Green Hydrogen Plant.Hour |
| Month | 11 | 11/1/2021 12:00:00 AM | PI Point | \\PII Green Hydrogen Plant.Month |
| Rate | 0.05 $kWh | 11/5/2021 3:00:00 PM | Table L... | SELECT Rate FROM [Energy Tariffs] WHERE [Ra |
| Rate Type | 2 | 11/5/2021 3:00:00 PM | Table L... | SELECT RateType FROM [Weeldy Energy Rates] |
| Season | Winter | 11/1/2021 12:00:00 AM | PI Point | \\PII Green Hydrogen Plant.Season |
| Weekday | Friday | 11/5/2021 12:00:00 AM | PI Point | \\PII Green Hydrogen Plant.Weekday |
| Category: Power | | | | |
| Estimated Cost of Power to Purchase | 313.94 $ | 11/5/2021 3:00:00 PM | PI Point | \\PII Green Hydrogen Plant.Estimated Cost of Power to Purchase |
| Power Demand - Daily | 8500 | 1/1/1970 12:00:00 AM | <None> | |
| Power Forecast - Daily | 6800 kW | 1/1/1970 12:00:00 AM | <None> | |
| Power Generated - Total | 29000 kW | 1/1/1970 12:00:00 AM | <None> | |
| Power Generated - Total Renewable | 35758 kW | 11/5/2021 3:00:00 PM | Formula | S-Power Generated - Solar;W Power Generated - Wind;[S+W] |
| Recommended Power to Purchase | 6278.8 kW | 11/5/2021 3:00:00 PM | PI Point | \\PII Green Hydrogen Plant Recommended Power to Purchase |
| Category: Production | | | | |
| H2 Daily Demand | 301.67 kg | 11/5/2021 12:00:00 AM | PI Point | \\PIIUFL.F_Hydrogen demand kg_per_day |
| H2 Daily Production - Actual | 145.8 kg | 11/5/2021 3:00:00 PM | PI Point | \\PII Green Hydrogen Plant.H2 Daily Production - Actual |
| H2 Daily Production - Delta | -155.87 kg | 11/5/2021 3:00:00 PM | PI Point | \\PII Green Hydrogen Plant.H2 Daily Production - Delta |
| H2 Daily Production - Projected EDD | 242.83 kg | 11/5/2021 3:00:00 PM | PI Point | \\PII Green Hydrogen Plant.H2 Daily Production Projected ECO |
| H2 Daily Production Renewable Pct | 89.3 % | 1/1/1970 12:00:00 AM | <None> | |

FIG. 7

SYSTEMS AND SERVERS FOR FIRST PRINCIPLES-BASED PROCESS SIMULATION DRIVEN SELECTION FOR APPROPRIATE RESOURCE/OPERATING MODE

BACKGROUND

Many industrial facilities include power plants on-site that generate electricity to run various plant components. Other industrial facilities rely on an electrical grid to power production equipment. In both cases, it is desirable to use green energy to reduce carbon emissions in consideration of the environment. The green energy may come from windmills or solar panels, as non-limiting examples. However, these green energy power sources do not always supply enough energy to maintain constant production as they are reliant on the weather. In these situations, it is often necessary to purchase energy from an alternate supplier, such as a natural gas or nuclear power plant to meet demand.

The current problem that most industrial facilities face is that a green energy availability deficit is not realized until there is a lack of available power. In hydrogen production facilities, for example, a certain amount of electrical energy is required for the electrolysis. Currently, when the availability of green energy drops, the hydrogen plant must lower its production output which results in production goals not being met if only green energy is being used. To mitigate this, electricity must be purchased from an alternate supplier at market price. If it were possible to know how much power would be needed to make up for the deficit, this alternate energy could be purchased ahead of time at a lower cost.

Therefore, there is a need in the art for a system that can predict when a green energy system will be at a deficit and identify the lowest cost alternate energy to maintain a production target.

SUMMARY

In some embodiments, the disclosure is directed to a system for predicting a deficit in green energy. In some embodiments, the system comprises one or more computers comprising one or more processors and one or more non-transitory computer readable media, the one or more non-transitory computer readable media comprising instructions that when executed cause the one or more computers to execute one or more steps. In some embodiments, the one or more computer implemented steps cause the computer to execute, by the one or more processors, a model simulation of an industrial process and/or one or more industrial components. In some embodiments, the one or more computer implemented steps cause the computer to receive, by the one or more processors, one or more data inputs. In some embodiments, the one or more computer implemented steps cause the computer to model, by the one or more processors, one or more industrial component effects on the industrial process using the one or more data inputs in the model simulation. In some embodiments, the one or more computer implemented steps cause the computer to execute, by the one or more processors, a future energy requirement for the one or more industrial components based on the one or more data inputs. In some embodiments, the one or more computer implemented steps cause the computer to execute, by the one or more processors, a future energy availability based on the one or more data inputs. In some embodiments, the one or more computer implemented steps cause the computer to display, by the one or more processors, a future energy deficit and/or a future energy surplus which are each based on a difference between the future energy availability and the future energy requirement.

In some embodiments, the one or more data inputs include one or more environmental inputs. In some embodiments, the one or more environmental inputs includes a weather forecast. In some embodiments, the one or more computer implemented steps cause the computer to execute, by the one or more processors, a future available sunlight prediction using the one or more environmental inputs. In some embodiments, the one or more computer implemented steps cause the computer to execute, by the one or more processors, a green energy prediction comprising a percentage of maximum available electrical power from a solar power plant using the future available sunlight prediction. In some embodiments, the one or more computer implemented steps cause the computer to input, by the one or more processors, the green energy prediction into the model simulation of an industrial process to determine the future energy deficit and/or the future energy surplus.

In some embodiments, the one or more computer implemented steps cause the computer to execute, by the one or more processors, a future available wind prediction using the one or more environmental inputs. In some embodiments, the one or more computer implemented steps cause the computer to execute, by the one or more processors, a green energy prediction comprising a percentage of maximum available electrical power from a wind power plant using the future available wind prediction. In some embodiments, the one or more computer implemented steps cause the computer to input, by the one or more processors, the green energy prediction into the model simulation of an industrial process to determine the future energy deficit and/or the future energy surplus.

In some embodiments, the model simulation comprises first principles based model simulation. In some embodiments, the one or more data inputs include a weather forecast. In some embodiments, the system is configured to use the weather forecast to determine the future energy availability. In some embodiments, the future energy availability includes a future percentage of maximum available electrical power from a solar power plant and/or a wind power plant. In some embodiments, the one or more computer implemented steps cause the computer to execute, by the one or more processors, an update to the future percentage of maximum available electrical power in response to a change in the weather forecast.

In some embodiments, the one or more computer implemented steps cause the computer to display, by the one or more processors, an alternate energy plan. In some embodiments, the alternate energy plan includes purchasing energy from an alternate energy source. In some embodiments, the one or more computer implemented steps cause the computer to determine, by the one or more processors, a time to purchase alternate energy from the alternate energy source when the alternate energy is at a minimum cost. In some embodiments, the alternate energy plan includes selling excess energy. In some embodiments, the one or more computer implemented steps cause the computer to determine, by the one or more processors, a time to sell the excess energy at a maximum value.

In some embodiments, the alternate energy plan includes adjusting one or more production targets to at least partially match the future energy deficit and/or the future energy surplus. In some embodiments, the one or more computer implemented steps cause the computer to display, by the one or more processors, a selection of alternate energy sources to at least partially supply the future energy requirement for the one or more industrial components.

DRAWINGS DESCRIPTION

FIG. 7 shows a configuration table for one or more system inputs and outputs according to some embodiments.

DETAILED DESCRIPTION

Figure 1:
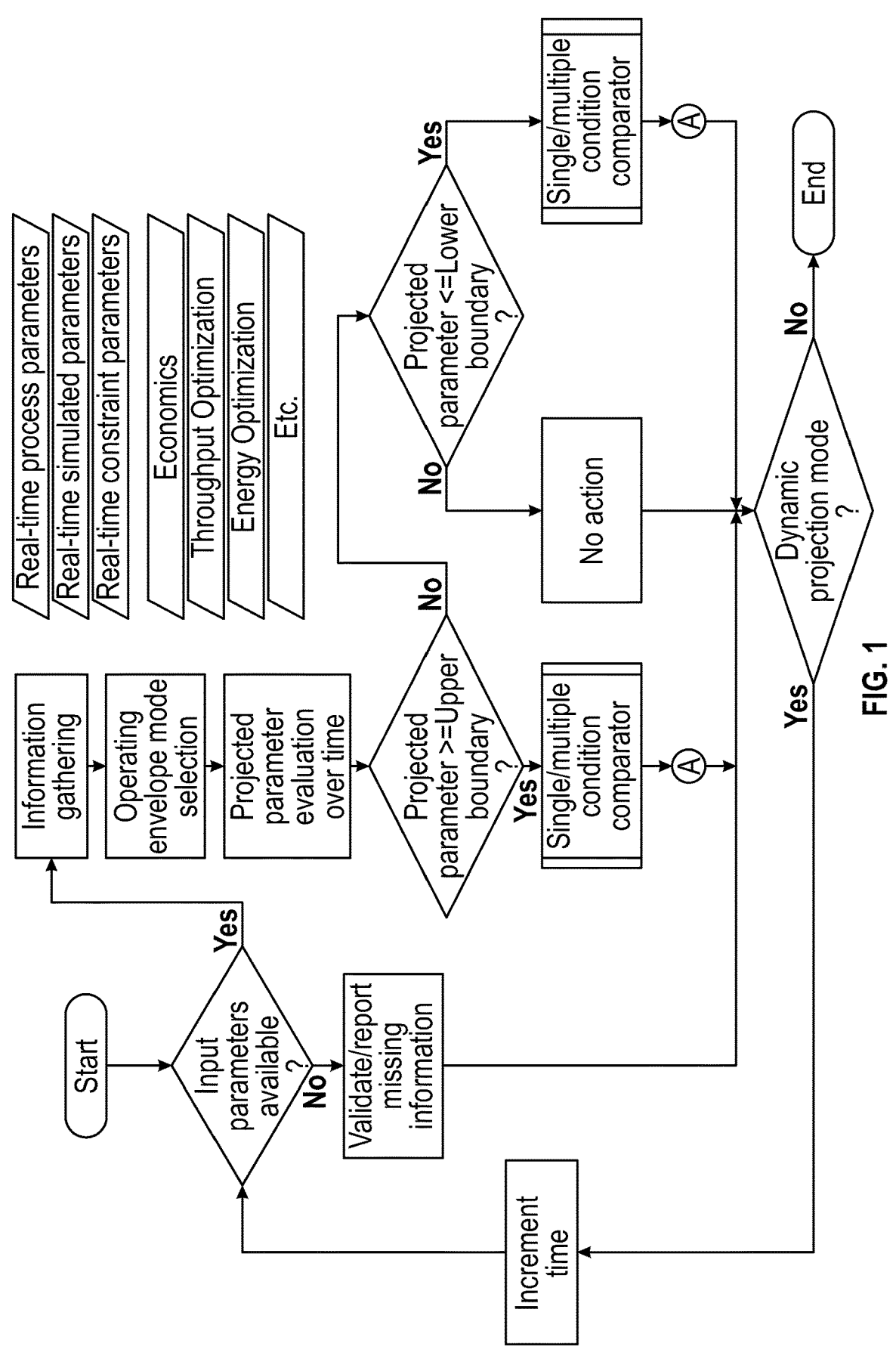
FIG. 1 shows a flowchart of one or more steps executed by the system according to some embodiments.
Figure 2:
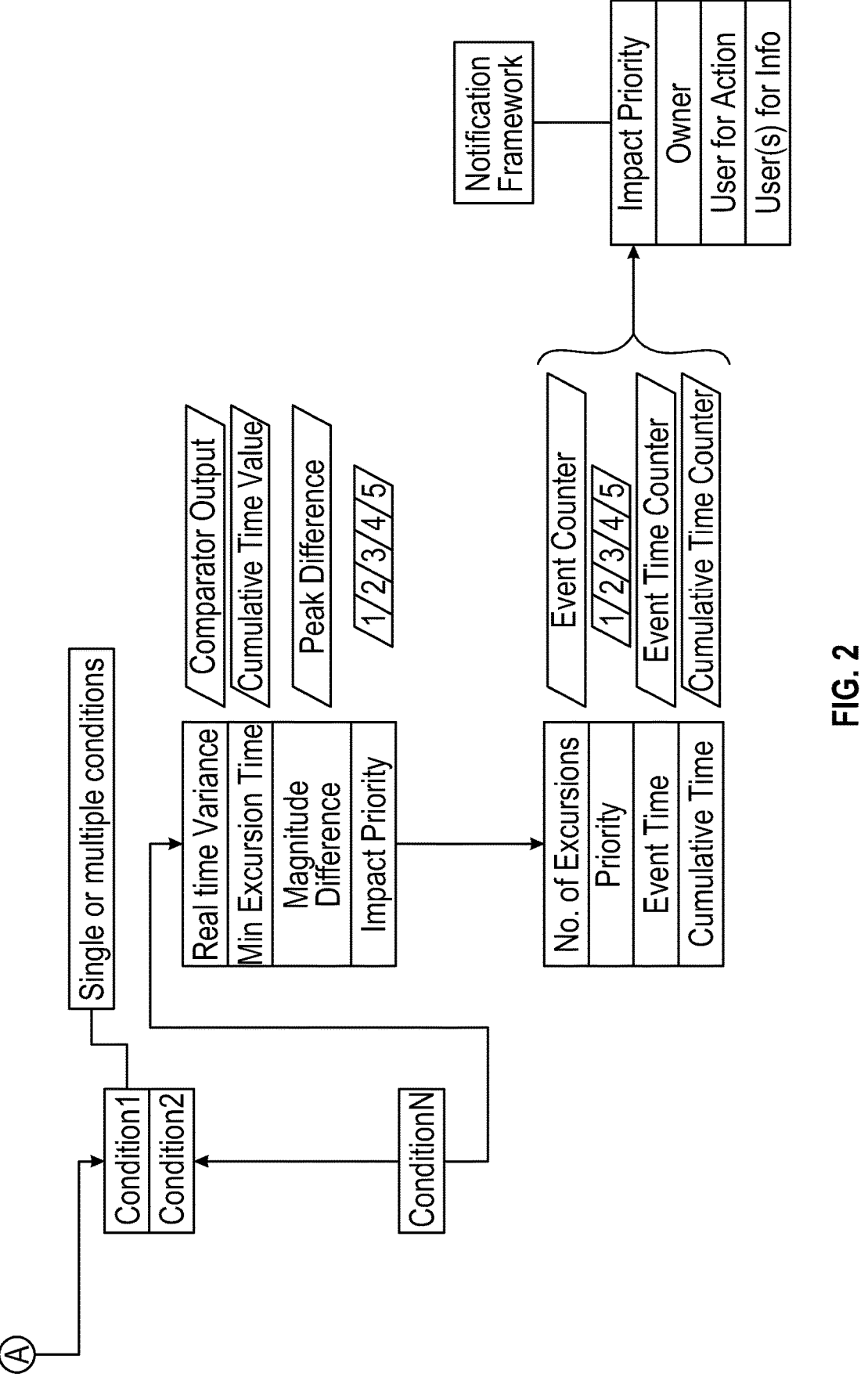
FIG. 2 is an extension of the FIG. 1 flowchart according to some embodiments.

FIG. 1 shows a flowchart of one or more steps executed by the system. FIG. 2 is an extension of the FIG. 1 flowchart. In some embodiments, the system is configured to receive one or more data inputs. In some embodiments, one or more data inputs include one or more environmental inputs, engineering inputs, and/or (near) real time operational and process inputs. In some embodiments, environmental inputs include a weather forecast. In some embodiments, a weather forecast any conventional information associated with weather prediction such as location, barometric pressure, cloud cover, chance of rain, wind velocity (direction and speed), fog, humidity, and UV index, as non-limiting examples. In some embodiments, environmental inputs include one or more of satellite imagery, radar, and surface maps.

In some embodiments, the system is configured to predict electrical power output from one or more green energy sources. In some embodiments, one or more green energy sources include solar power plants and/or wind power plants. In some embodiments, the system is configured to determine a percentage of available sunlight from one or more environmental inputs. In some embodiments, the system is configured to execute a future available sunlight prediction using one or more environmental inputs. In some embodiments, the system is configured to predict a percentage of maximum available electrical power from a solar power plant using the future available sunlight prediction. In some embodiments, the system is configured to input the percentage of maximum available electrical power from a solar power plant into a model simulation of an industrial facility to determine a green energy deficit. In some embodiments, the model simulation comprises a first principles model simulation. In some embodiments, a first principles model simulation provides the benefit of being able to accurately model each industrial components effect on the entire system as opposed to an estimation using other means.

In some embodiments, the system is configured to determine a percentage of available wind power from one or more environmental inputs. In some embodiments, the system is configured to execute one or more wind pattern predictions using the one or more environmental inputs. In some embodiments, the system is configured to predict a percentage of maximum available wind power from a wind power plant using the one or more wind pattern predictions.

Figure 3:
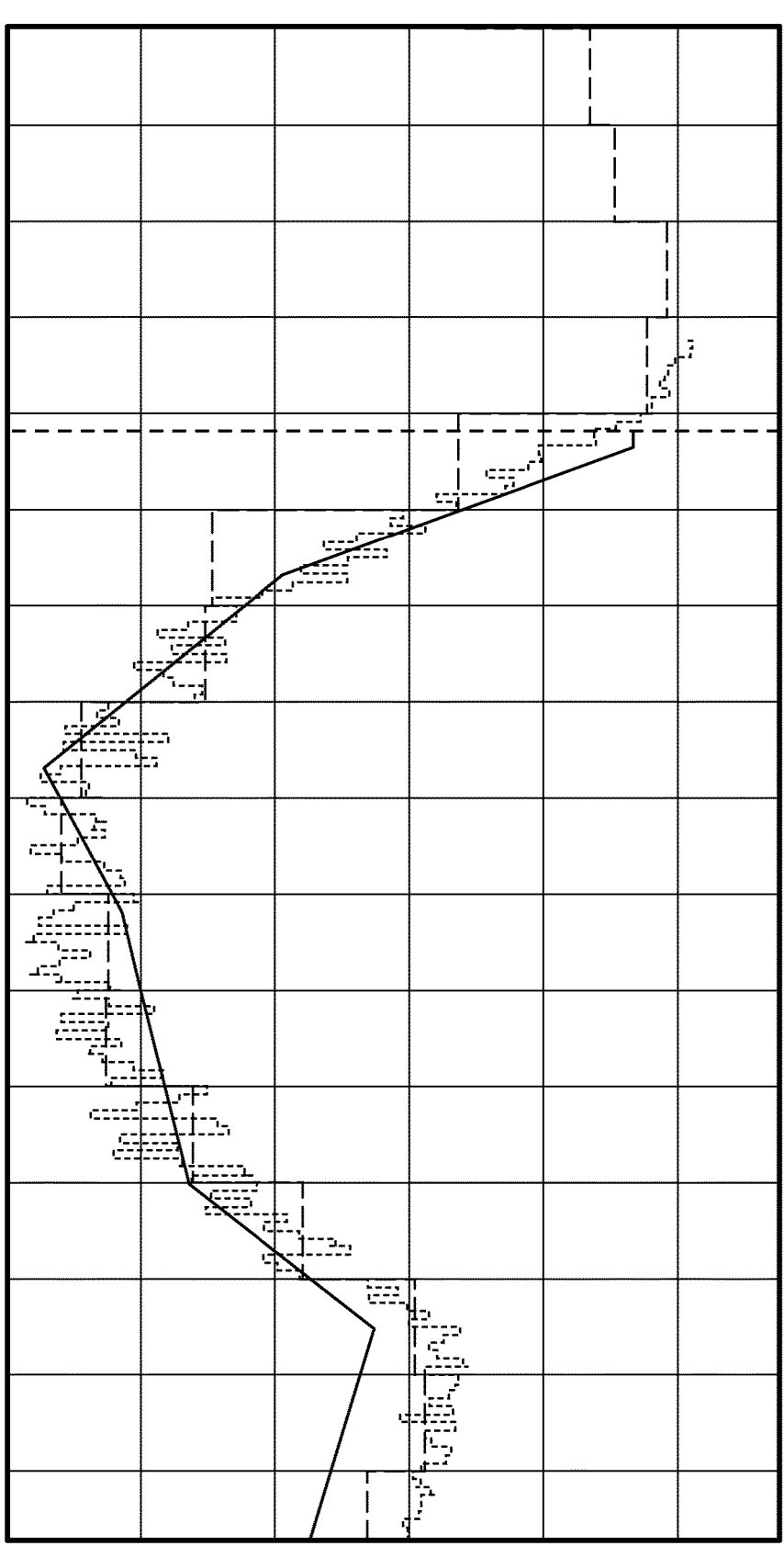
FIG. 3 shows a non-limiting example of the system dynamically adjusting production and/or target driven production.

In some embodiments, the system includes a reactive dynamic simulation response. In some embodiments, the system is configured to periodically and/or continuously update one or more system outputs based on inputs. As a non-limiting example, in some embodiments, the system is configured to forecast green energy availability for 30 days based on current environmental inputs. In some embodiments, as each day passes, the system is configured to update the simulation model with new environmental inputs, thereby refining the predictions to align with current environmental conditions. In some embodiments, the system is configured to execute a confidence interval associated with one or more timeframes. For example, predictions for a solar power plant where cloud cover and storms are expected throughout the month may include a low confidence level (e.g., 30%) for a 30 day prediction, but a high confidence level (e.g., 95%) for a 3 day prediction. In another non-limiting example, where one or more environmental input includes a forecast for almost no clouds for 7 days, the confidence level may be high (e.g., 90%) for maximum power availability from a solar power plant for the next 7 day. FIG. 3 shows a non-limiting example of the system dynamically adjusting production and/or target driven production. In some embodiments, the long-dashed line shows a target based on one or more conditions. In some embodiments, the short-dashed line shows the predicted power supply as determined by the simulation module. In some embodiments, the solid line illustrates the actual system conditions as a result of optimization of the workflow using one or more predictions.

In some embodiments, the system is configured to use artificial intelligence (AI) to predict the effects of environmental inputs on green energy production. In some embodiments, the system is configured to store one or more environmental inputs and/or one or more system predictions in one or more databases. In some embodiments, the system is configured to train the AI to predict the outcome of environmental inputs on green energy sources. In some embodiments, the actual impact of one or more environmental inputs are feed to the AI as a training data set. In some embodiments, environmental inputs include any combination of forecasting sources such as those mentioned above. Using this information, the system configured to predict a total affect on future green energy production using historical data stored on one or more historian servers. In some embodiments, the system is configured to send AI analyzed data as an input to one or more components in the first principles model.

In some embodiments, the system is configured to include AI driven predictive maintenance into the first principles model. In some embodiments, the system includes an AI driven predictive maintenance module. In some embodiments, the predictive maintenance module is configured to send maintenance data to the simulation module executing the first principles model of the industrial facility. In some embodiments, the simulation module is configured to analyze the maintenance data and display the effect a maintenance event (i.e., repair, failure) will have on the system. As a non-limiting example, in some embodiments, if a component within the model simulation will be offline for a period, the system will display the effect on power demand. As another a non-limiting example, in some embodiments, if an electrical power plant component is scheduled to be offline, the system is configured to display the effect on power supply. In some embodiments, the system is configured to determine an optimum time for scheduled maintence for the power plant and/or industrial facility based on predicted power supply and/or production demand. In some embodiments, the system is configured to interface with one or more electrical power plant databases to obtain the maintenance data. In some embodiments, the system is configured to display a suggestion for an alternate energy source and/or purchase a (lowest cost) energy source based on one or more predictions describe herein.

In some embodiments, the system is configured to identify an energy surplus from one or more green energy systems. In some embodiments, the system is configured to generate a display (display as used herein includes a report and/or alert sent to one or more computers, as well as a graphical user interface comprising one or more analytical tools such as graphs and charts) describing future excess energy predictions. In some embodiments, the system is configured to display an estimated energy revenue from the sale of the excess energy back to support an alternate energy grid. In some embodiments, the system is configured to adjust production targets in order to enable an increase production before a predicted energy deficit in order to maintain an average production output. In some embodiments, the system is configured to display one or more graphs showing a time and/or effect of an energy surplus and/or deficit.

In some embodiments, the system includes operating envelopes driven by one or more of economics (reduce cost and increase revenue), throughput optimization (maximize production), energy optimization (minimize energy consumption), and demand-driven agility. In some embodiments, the system includes real time (any reference to real time is also a reference to near real time and/or a simultaneous execution) projected inputs. In some embodiments, the system is configured to superimpose and/or display simulation boundaries onto real time process information. In some embodiments, the system includes a single and/or multiple condition comparators. The comparator or comparators may be configured to perform different types of calculations. For example, a comparator can be a totalizer function that aggregates the cumulative time when the envelope was in deviation during a set time window or when there is a large magnitude deviation/peak difference, wherein there is a peak for a short duration of time. The comparator logic can leverage complex calculations and advanced analytics, such as an output from the real-time simulator. In some embodiments, the system includes an event driven work process defining corrective measure to bring a process back to a state within an operating envelope. In some embodiments, the system includes a unified approach between simulation, real-time operations, and work process management. In some embodiments, the system includes dynamic and optimized operational and process boundaries. In some embodiments, the system includes proactive and optimized process adherence for efficient data-driven decision making. In some embodiments, the system is configured to unify simulation and real time operations data, leveraging simulation software for projections displayed in real time. In some embodiments, the system includes actions driven by dynamic operating envelopes generated based on a simulated data analysis.

In some embodiments, the system includes a first principles-based process simulation driven selection for appropriate resources, for example, energy sources and operating condition selection for green hydrogen production. In some embodiments, the system is configured to execute first principles-based process simulation and display a selection of appropriate energy resources to meet the demand forecasted by the process simulation which include, for example, energy source and operating condition selection for green hydrogen production.

Figure 4:
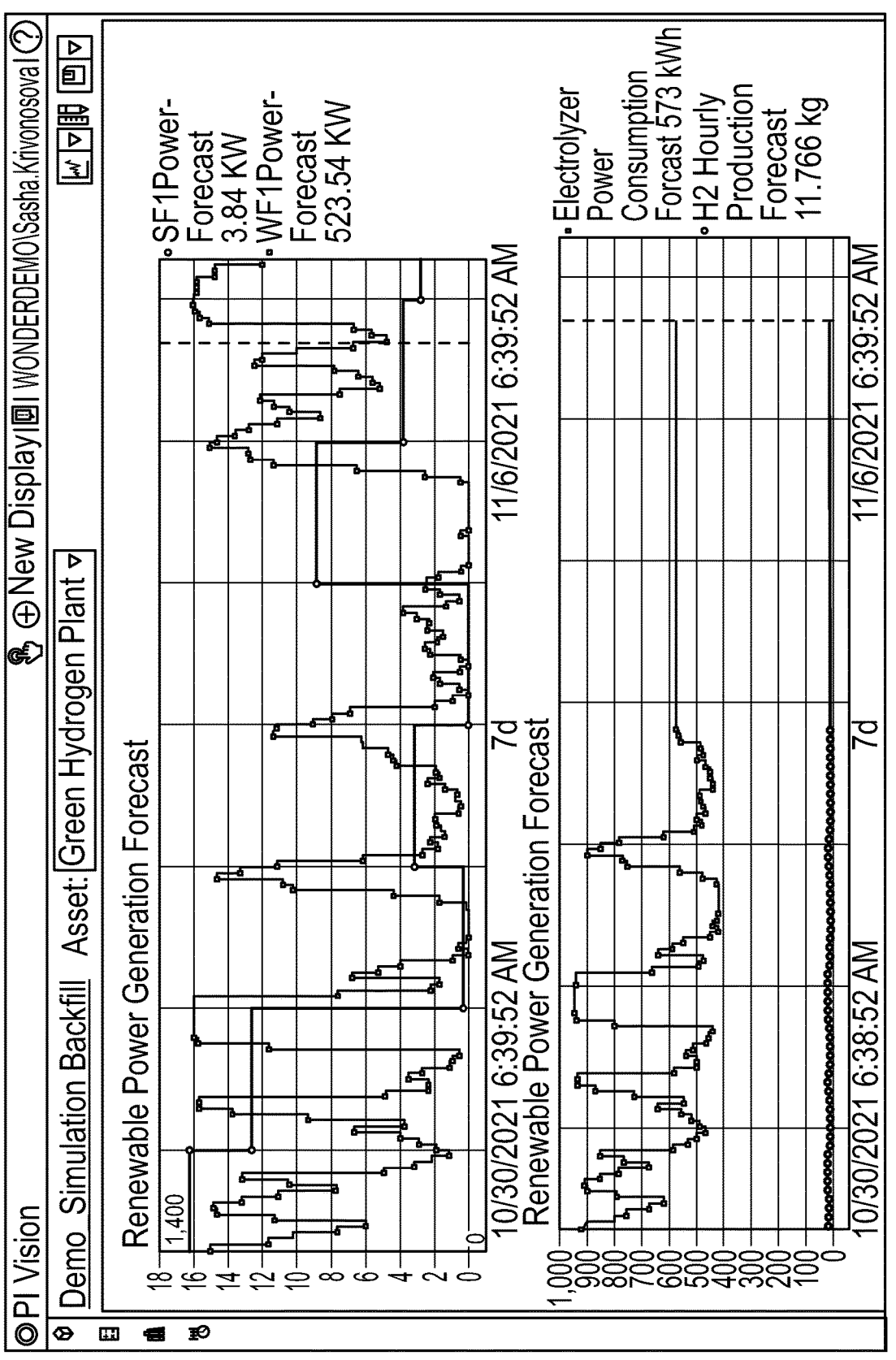
FIG. 4 shows a non-limiting example of the system implemented in a hydrogen production facility (process) according to some embodiments.

FIG. 4 shows a non-limiting example of the system implemented in a hydrogen production facility according to some embodiments. In some embodiments, the top chart shows an aspect of the system configured to display one or more of a solar power (SF1Power) prediction and/or wind power (WF1Power) forecast for 7 days, although the system can be set to any number of days according to some embodiments. In some embodiments, the bottom chart shows an H2 production forecast and electrolyzer power consumption forecast (same scale) according to some embodiments. In some embodiments, the system is configured to display one or more parameters on a single chart and/or multiple charts where each chart can include one or more scales. In some embodiments, the system is configured to generate a graphical user interface (GUI) that displays one or more components and/or analytics as shown in FIGS. 4-10.

Figure 5:
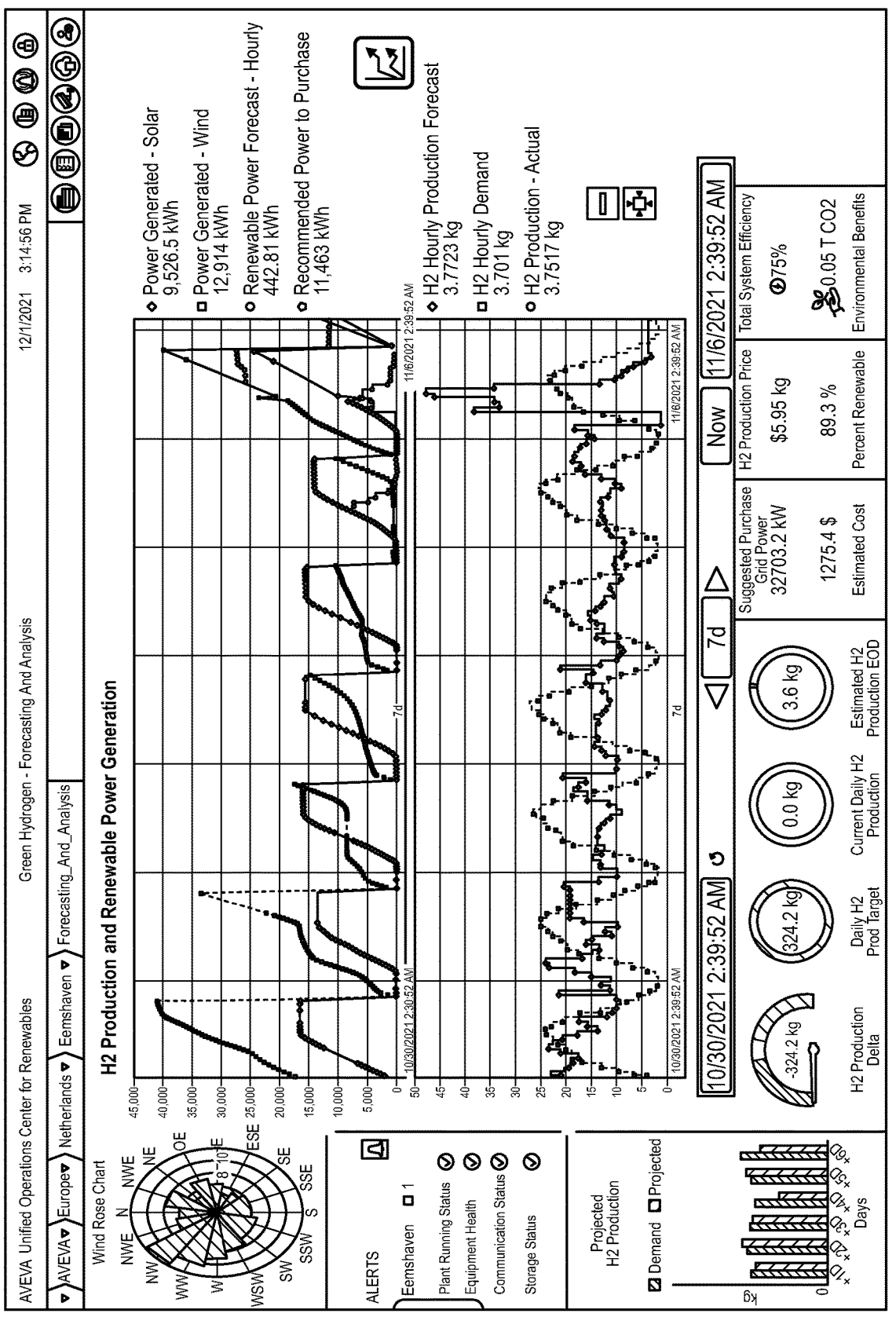
FIG. 5 shows a data visualization lay demonstrating overly of future production projection dynamically generated by the simulation module combined with operating condition selection recommendation according to some embodiments.

FIG. 5 shows a data visualization demonstrating an overlay of future production projection (estimated H2 production EOD) dynamically generated by the simulation module combined with operating condition selection recommendation (suggested purchase grid power). In some embodiments, the recommendation is generated by the analytics module for an optimal operating envelope give the current system efficiency (total system efficiency), inventory, production demand, and/or spot market prices. In some embodiments, the system is configured to determine the required amount of product storage to meet a future demand with a given projected power supply.

Figure 6:
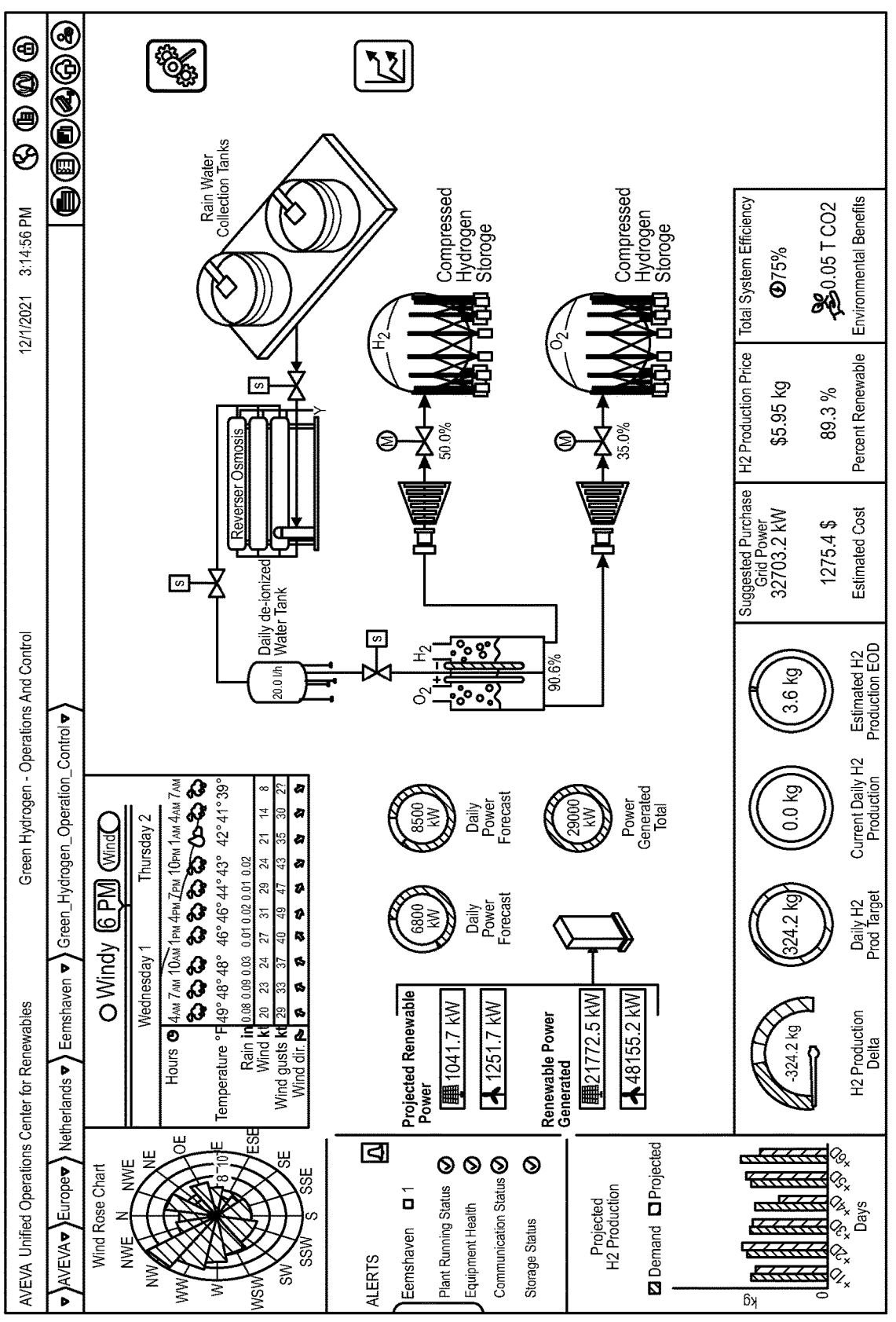
FIG. 6 illustrates an overall process visualization according to some embodiments.
Figure 7:
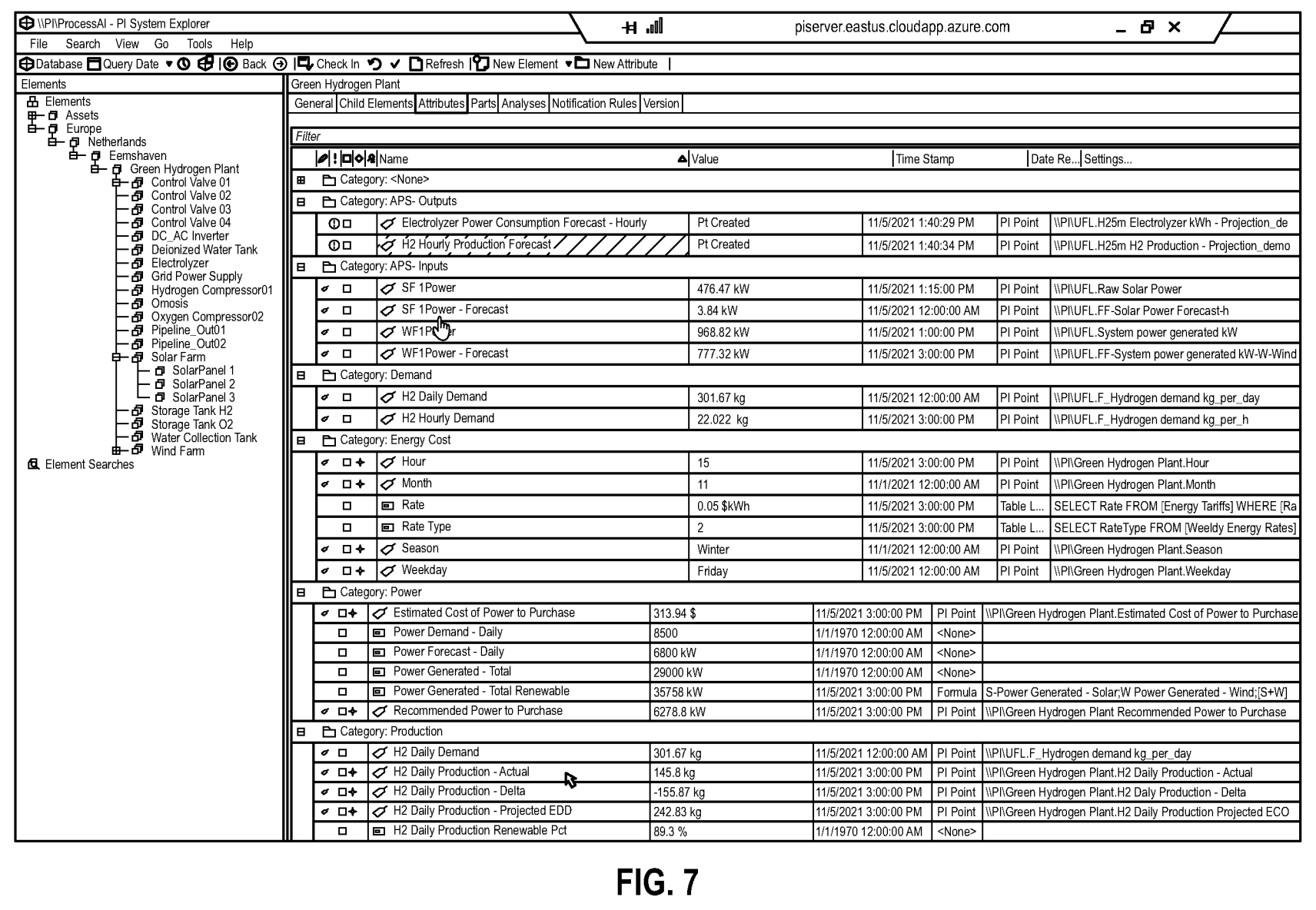

FIG. 6 illustrates an overall process visualization according to some embodiments. FIG. 7 shows a configuration table for one or more system inputs and outputs according to some embodiments. In some embodiments, at least a portion of a configuration module executing one or more portions of the system includes a data management system configured to receive, analyze, and/or store time-series operational data (e.g., AVEVA PI system).

Figure 8:
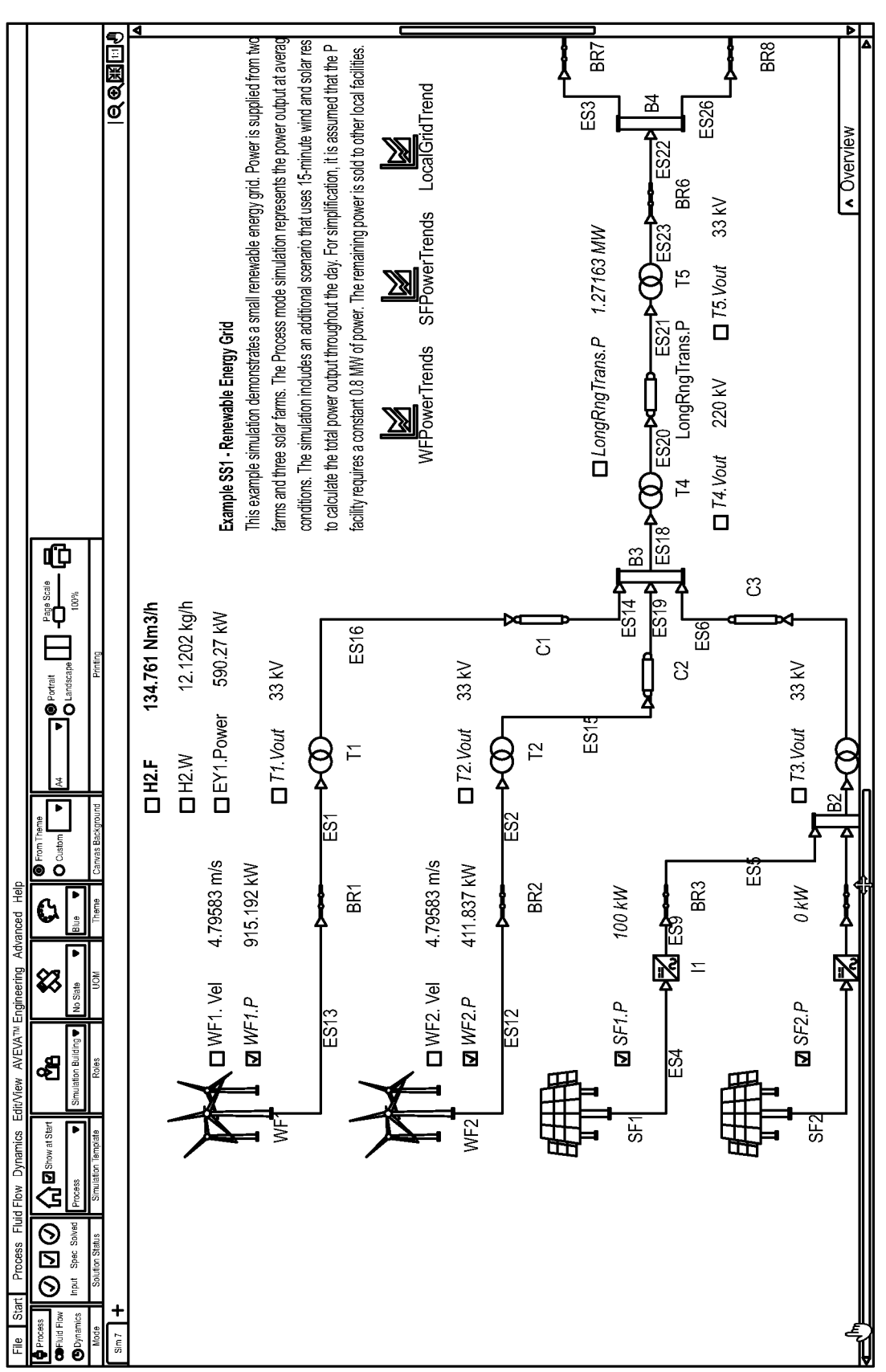
FIG. 8 shows a portion of the simulation model including wind and solar power sources according to some embodiments.
Figure 9:
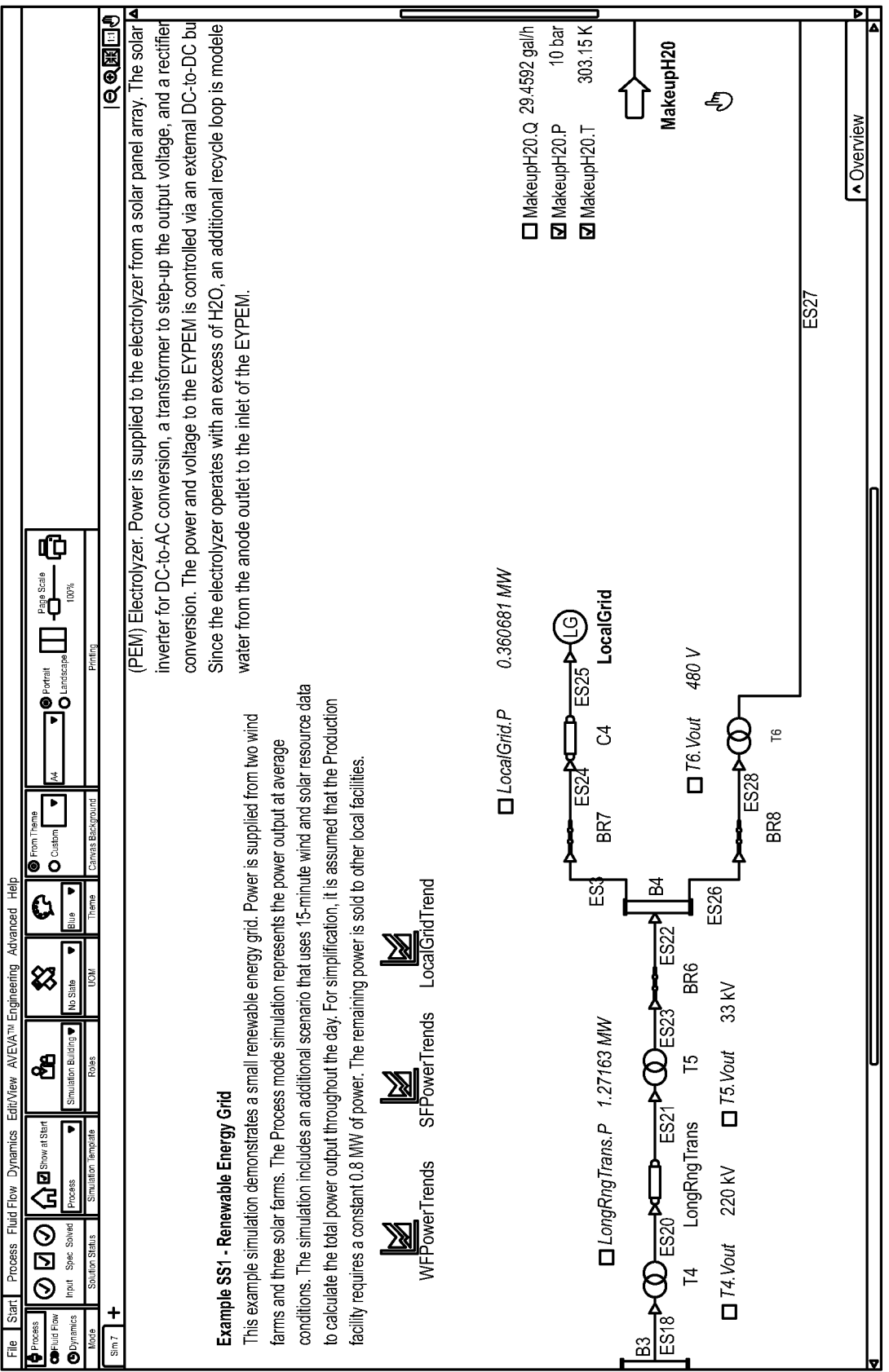
FIG. 9 shows a continuation of the simulation model in FIG. 8 showing a portion of the electrical grid according to some embodiments.
Figure 10:
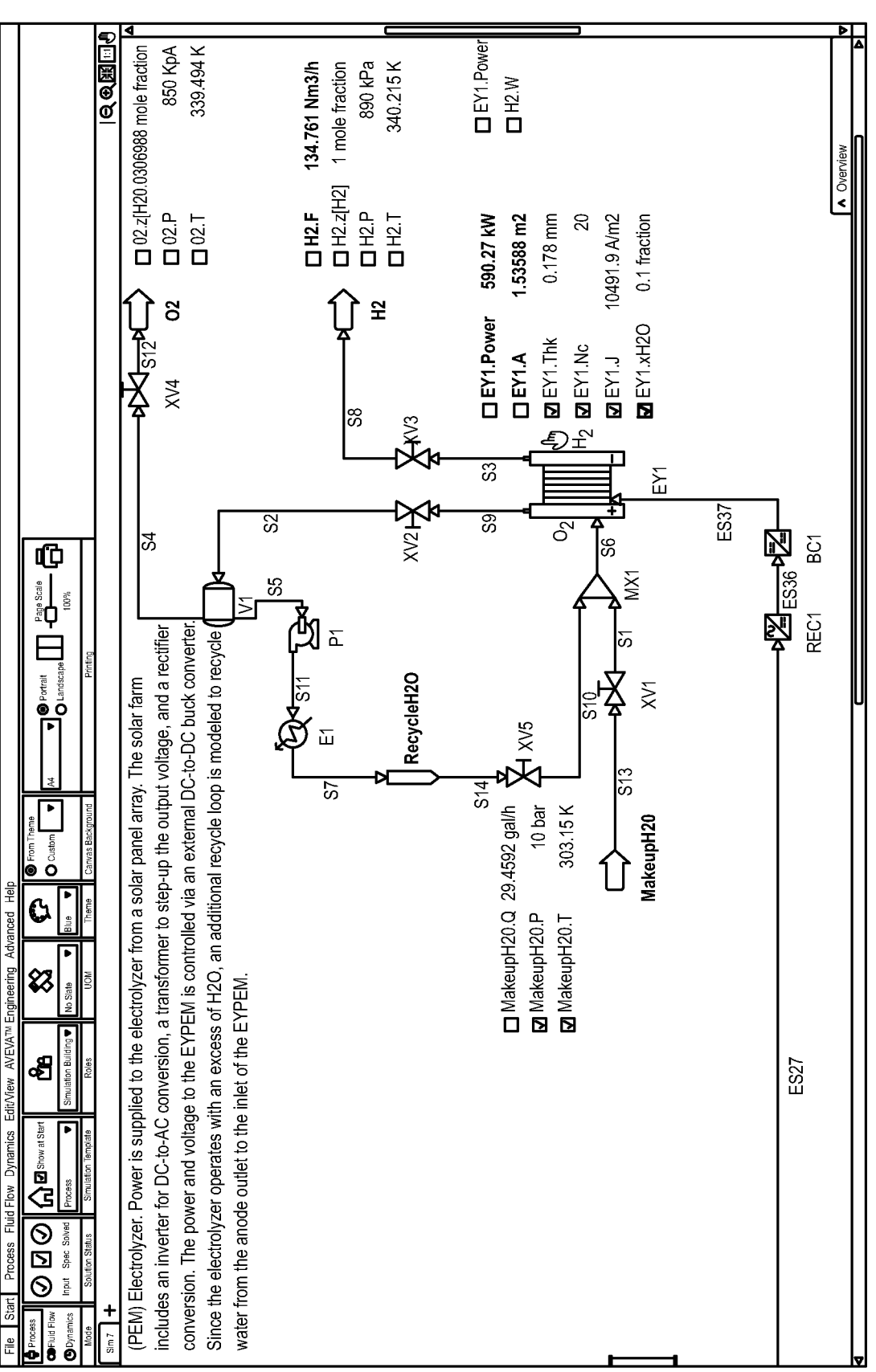
FIG. 10 is a continuation of FIGS. 8 and 9 including an industrial facility electrolyzer according to some embodiments.
Figure 11:
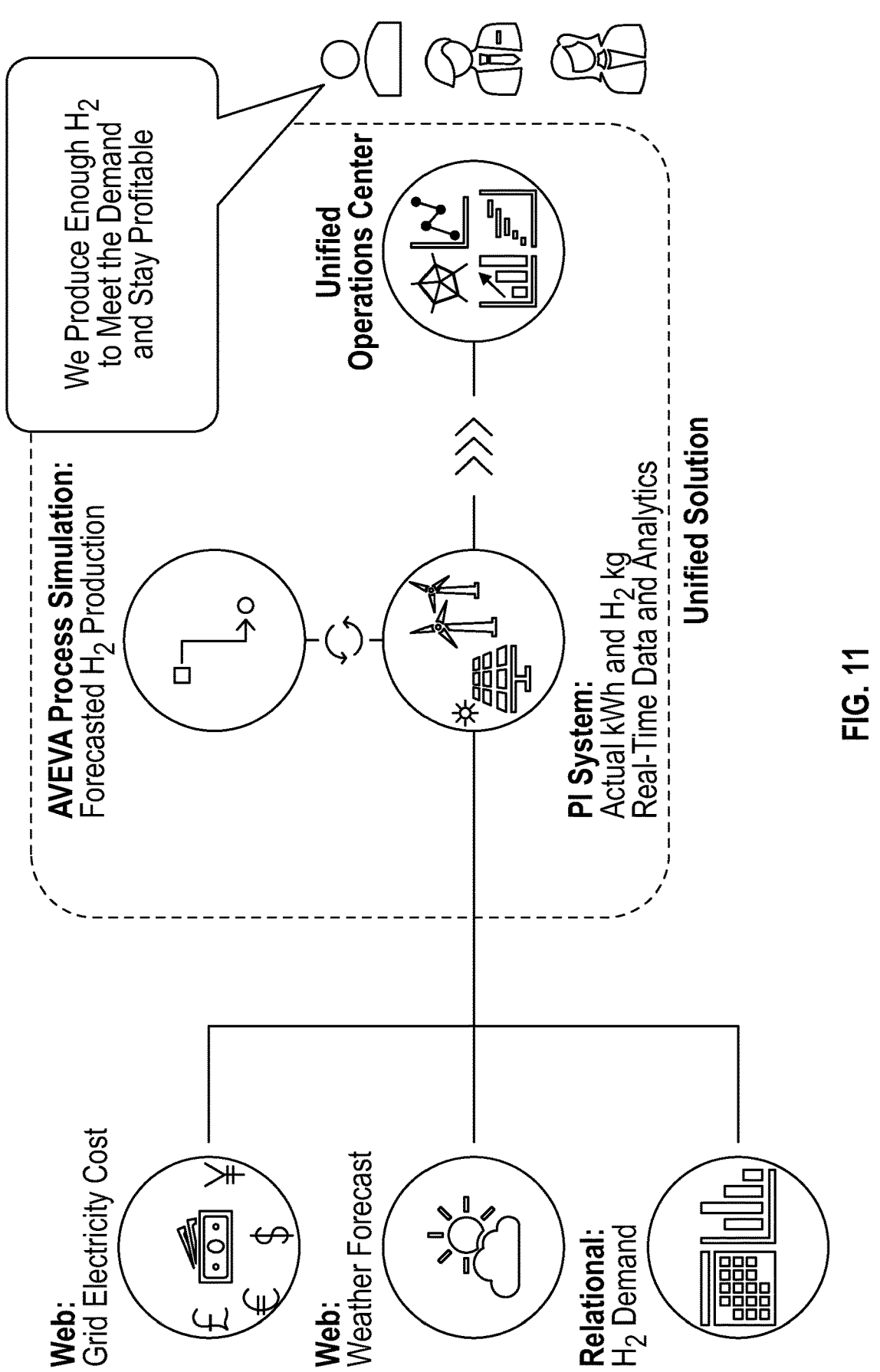
FIG. 11 depicts an example schematic for a non-limiting green hydrogen industrial facility according to some embodiment.

FIG. 8 shows a portion of the simulation model including wind and solar power sources according to some embodiments. FIG. 9 shows a continuation of the simulation model in FIG. 8 showing a portion of the electrical grid according to some embodiments. FIG. 10 is a continuation of FIGS. 8 and 9 including an industrial facility electrolyzer according to some embodiments. FIG. 11 depicts an example schematic for a non-limiting green hydrogen industrial facility according to some embodiment. In some embodiments, the system is configured to display one or more objects representing one or more aspects of a power source and/or industrial facility as depicted in the figures presented herein.

Figure 12:
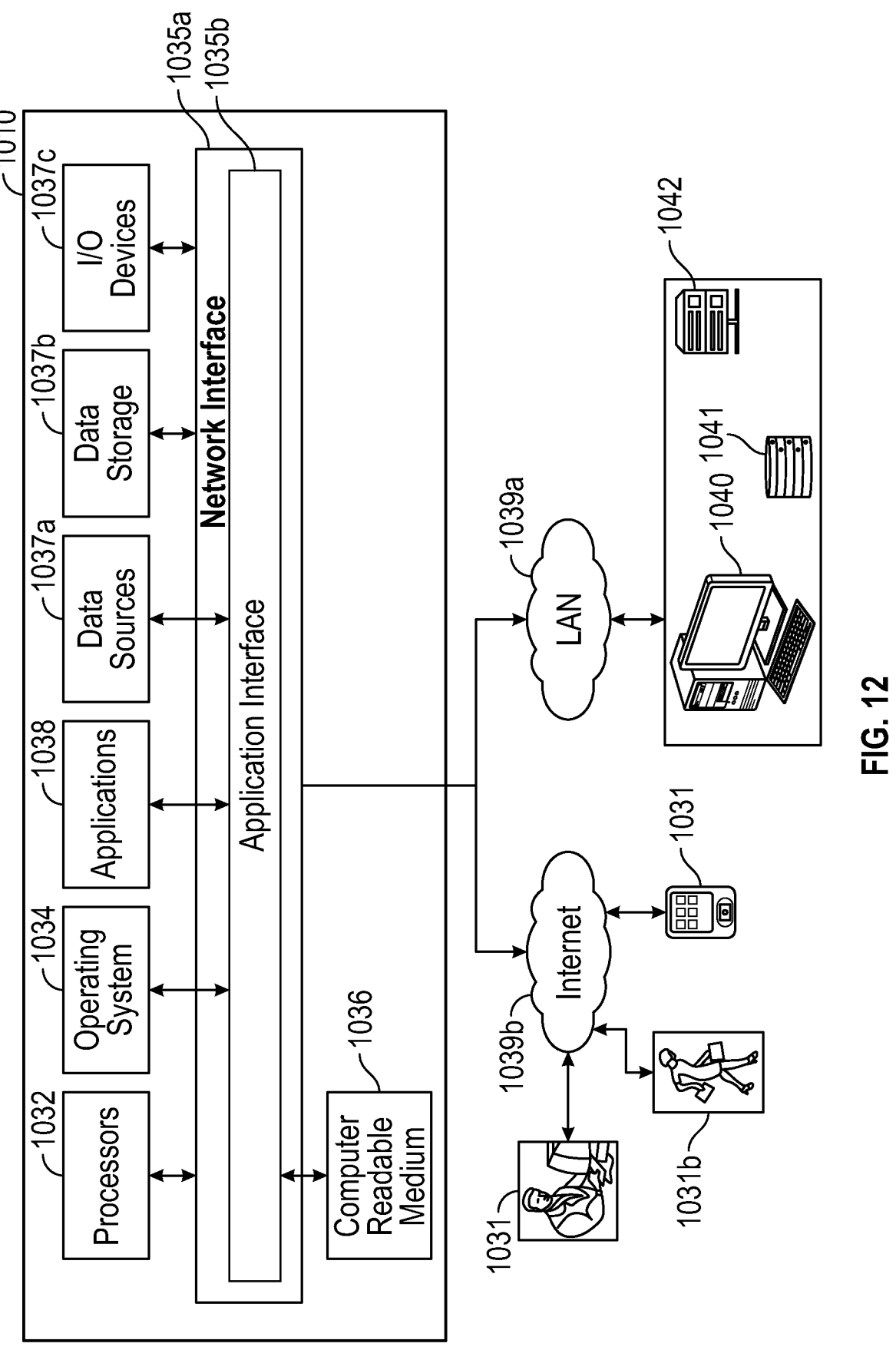
FIG. 12 illustrates a computer system 1010 enabling or comprising the systems and methods in accordance with some embodiments of the system.

FIG. 12 illustrates a computer system 1010 enabling or comprising the systems and methods in accordance with some embodiments of the system. In some embodiments, the computer system 1010 can operate and/or process computer-executable code of one or more software modules of the aforementioned system and method. Further, in some embodiments, the computer system 1010 can operate and/or display information within one or more graphical user interfaces (e.g., HMIs) integrated with or coupled to the system.

In some embodiments, the computer system 1010 can comprise at least one processor 1032. In some embodiments, the at least one processor 1032 can reside in, or coupled to, one or more conventional server platforms (not shown). In some embodiments, the computer system 1010 can include a network interface 1035a and an application interface 1035b coupled to the least one processor 1032 capable of processing at least one operating system 1034. Further, in some embodiments, the interfaces 1035a, 1035b coupled to at least one processor 1032 can be configured to process one or more of the software modules (e.g., such as enterprise applications 1038). In some embodiments, the software application modules 1038 can include server-based software, and can operate to host at least one user account and/or at least one client account, and operate to transfer data between one or more of these accounts using the at least one processor 1032.

With the above embodiments in mind, it is understood that the system can employ various computer-implemented operations involving data stored in computer systems. Moreover, the above-described databases and models described throughout this disclosure can store analytical models and other data on computer-readable storage media within the computer system 1010 and on computer-readable storage media coupled to the computer system 1010 according to various embodiments. In addition, in some embodiments, the above-described applications of the system can be stored on computer-readable storage media within the computer system 1010 and on computer-readable storage media coupled to the computer system 1010. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 1010 can comprise at least one computer readable medium 1036 coupled to at least one of at least one data source 1037a, at least one data storage 1037b, and/or at least one input/output 1037c. In some embodiments, the computer system 1010 can be embodied as computer readable code on a computer readable medium 1036. In some embodiments, the computer readable medium 1036 can be any data storage that can store data, which can thereafter be read by a computer (such as computer 1040). In some embodiments, the computer readable medium 1036 can be any physical or material medium that can be used to tangibly store the desired information or data or instructions and which can be accessed by a computer 1040 or processor 1032. In some embodiments, the computer readable medium 1036 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 1036 can transmit or carry instructions to a remote computer 1040 and/or at least one user 1031, including a router, private or public network, or other transmission or channel, both wired and wireless. In some embodiments, the software application modules 1038 can be configured to send and receive data from a database (e.g., from a computer readable medium 1036 including data sources 1037a and data storage 1037b that can comprise a database), and data can be received by the software application modules 1038 from at least one other source. In some embodiments, at least one of the software application modules 1038 can be configured within the computer system 1010 to output data to at least one user 1031 via at least one graphical user interface rendered on at least one digital display.

In some embodiments, the computer readable medium 1036 can be distributed over a conventional computer network via the network interface 1035a where the system embodied by the computer readable code can be stored and executed in a distributed fashion. For example, in some embodiments, one or more components of the computer system 1010 can be coupled to send and/or receive data through a local area network ("LAN") 1039a and/or an internet coupled network 1039b (e.g., such as a wireless internet). In some embodiments, the networks 1039a, 1039b can include wide area networks ("WAN"), direct connections (e.g., through a universal serial bus port), or other forms of computer-readable media 1036, or any combination thereof.

In some embodiments, components of the networks 1039a, 1039b can include any number of personal computers 1040 which include for example desktop computers, and/or laptop computers, or any fixed, generally non-mobile internet appliances coupled through the LAN 1039a. For example, some embodiments include one or more of personal computers 1040, databases 1041, and/or servers 1042 coupled through the LAN 1039a that can be configured for any type of user including an administrator. Some embodiments can include one or more personal computers 1040 coupled through network 1039b. In some embodiments, one or more components of the computer system 1010 can be coupled to send or receive data through an internet network (e.g., such as network 1039b). For example, some embodiments include at least one user 1031a, 1031b, is coupled wirelessly and accessing one or more software modules of the system including at least one enterprise application 1038 via an input and output ("I/O") 1037c. In some embodiments, the computer system 1010 can enable at least one user 1031a, 1031b, to be coupled to access enterprise applications 1038 via an I/O 1037c through LAN 1039a. In some embodiments, the user 1031 can comprise a user 1031a coupled to the computer system 1010 using a desktop computer, and/or laptop computers, or any fixed, generally non-mobile internet appliances coupled through the internet 1039b. In some embodiments, the user can comprise a mobile user 1031b coupled to the computer system 1010. In some embodiments, the user 1031b can connect using any mobile computing 1031c to wireless coupled to the computer system 1010, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of future power and production prediction by incorporating environmental factors and AI analysis as input into a first principles-based model. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Any text in the drawings is part of the system's disclosure and is understood to be readily incorporable into any description of the metes and bounds of the system. Any functional language in the drawings is a reference to the system being configured to perform the recited function, and structures shown or described in the drawings are to be considered as the system comprising the structures recited therein. Any figure depicting a graphical user interface is a disclosure of the system configured to display the contents of the graphical user interface. It is understood that defining the metes and bounds of the system using a description of images in the drawing does not need a corresponding text description in the written specification to fall with the scope of the disclosure.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system. The phrase "configured to" also denotes the step of configuring a structure or computer to execute a function in some embodiments.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for predicting a deficit in energy comprising: one or more computers comprising one or more processors and one or more non-transitory computer readable media, the one or more non-transitory computer readable media comprising instructions that when executed cause the one or more computers to:

execute, by the one or more processors, a model simulation of an industrial process and one or more industrial components;

receive, by the one or more processors, one or more data inputs;

model, by the one or more processors, effects of the one or more industrial components on the industrial process using the one or more data inputs in the model simulation;

predict, by the one or more processors, a future energy requirement for the one or more industrial components at a future time based on the one or more data inputs;

predict, by the one or more processors, a future energy availability at the future time based on the one or more data inputs;

determine, by the one or more processors, an alternative energy source based on at least one of a future energy deficit and a future energy surplus, the future energy deficit and the future energy surplus being based on a difference between the future energy availability and the future energy requirement; and power, by the one or more processors, the one or more industrial components using the alternative energy source at the future time to optimize energy efficiency for the industrial process.

2. The system of claim 1, wherein the model simulation comprises first principles based model simulation.

3. The system of claim 1, the one or more non-transitory computer readable media comprising further instructions that when executed cause the one or more computers to:

display, by the one or more processors, a selection of alternate energy sources to at least partially supply the future energy requirement for the one or more industrial components.

4. The system of claim 1, wherein the one or more data inputs include one or more environmental inputs.

5. The system of claim 4, wherein the one or more environmental inputs includes a weather forecast.

6. The system of claim 4, the one or more non-transitory computer readable media comprising further instructions that when executed cause the one or more computers to: execute, by the one or more processors, a future available sunlight prediction using the one or more environmental inputs.

7. The system of claim 6, the one or more non-transitory computer readable media comprising further instructions that when executed cause the one or more computers to:

execute, by the one or more processors, a green energy prediction comprising a percentage of maximum available electrical power from a solar power plant using the future available sunlight prediction.

8. The system of claim 7, the one or more non-transitory computer readable media comprising further instructions that when executed cause the one or more computers to:

input, by the one or more processors, the green energy prediction into the model simulation of an industrial facility to determine the future energy deficit and/or the future energy surplus.

9. The system of claim 4, the one or more non-transitory computer readable media comprising further instructions that when executed cause the one or more computers to:

execute, by the one or more processors, a future available wind prediction using the one or more environmental inputs.

10. The system of claim 9, the one or more non-transitory computer readable media comprising further instructions that when executed cause the one or more computers to:

execute, by the one or more processors, a green energy prediction comprising a percentage of maximum available electrical power from a wind power plant using the future available wind prediction.

11. The system of claim 10, the one or more non-transitory computer readable media comprising further instructions that when executed cause the one or more computers to:

input, by the one or more processors, the green energy prediction into the model simulation of an industrial process to determine the future energy deficit and/or the future energy surplus.

12. The system of claim 1, wherein the one or more data inputs include a weather forecast; and wherein the system is configured to use the weather forecast to determine the future energy availability.

13. The system of claim 12, wherein the future energy availability includes a future percentage of maximum available electrical power from a solar power plant and/or a wind power plant.

14. The system of claim 13, the one or more non-transitory computer readable media comprising further instructions that when executed cause the one or more computers to:

execute, by the one or more processors, an update to the future percentage of maximum available electrical power in response to a change in the weather forecast.

15. The system of claim 1, the one or more non-transitory computer readable media comprising further instructions that when executed cause the one or more computers to:

display, by the one or more processors, an alternate energy plan.

16. The system of claim 15, wherein the alternate energy plan includes purchasing energy from an alternate energy source.

17. The system of claim 16, the one or more non-transitory computer readable media comprising further instructions that when executed cause the one or more computers to:

determine, by the one or more processors, a time to purchase alternate energy from the alternate energy source when the alternate energy is at a minimum cost.

18. The system of claim 15, wherein the alternate energy plan includes selling excess energy.

19. The system of claim 18, the one or more non-transitory computer readable media comprising further instructions that when executed cause the one or more computers to:

determine, by the one or more processors, a time to sell the excess energy at a maximum value.

20. The system of claim 15, wherein the alternate energy plan includes adjusting one or more production targets to at least partially match the future energy deficit and/or the future energy surplus.

* * * * *